United States Patent
Gnech et al.

(10) Patent No.: US 10,346,503 B2
(45) Date of Patent: *Jul. 9, 2019

(54) WEB-BROWSER BASED STATE REPOSITORY

(71) Applicant: INTERNATIONAL BUSINESS MACHINES CORPORATION, Armonk, NY (US)

(72) Inventors: Thomas H. Gnech, Ammerbuch (DE); Steffen Koenig, Heidelberg (DE); Oliver Petrik, Stuttgart (DE); Holger J. Scheller, Meckesheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/483,535

(22) Filed: Apr. 10, 2017

(65) Prior Publication Data

US 2017/0212965 A1   Jul. 27, 2017

Related U.S. Application Data

(63) Continuation of application No. 12/421,102, filed on Apr. 9, 2009, now Pat. No. 9,639,626.

(51) Int. Cl.
| | | |
|---|---|---|
| *G06F 16/958* | (2019.01) | |
| *G06F 16/957* | (2019.01) | |
| *G06F 16/955* | (2019.01) | |
| *G06F 16/954* | (2019.01) | |
| *G06F 3/0483* | (2013.01) | |
| *G06F 17/21* | (2006.01) | |

(52) U.S. Cl.
CPC ......... *G06F 16/986* (2019.01); *G06F 3/0483* (2013.01); *G06F 16/954* (2019.01); *G06F 16/955* (2019.01); *G06F 16/957* (2019.01); *G06F 17/212* (2013.01)

(58) Field of Classification Search
CPC ......... G06F 17/30896; G06F 17/30873; G06F 17/30876; G06F 17/30899; G06F 16/986; G06F 16/958; G06F 16/954; G06F 16/955; G06F 16/957; G06F 3/0483; G06F 17/212

See application file for complete search history.

(56) References Cited

U.S. PATENT DOCUMENTS

| | | |
|---|---|---|
| 5,774,670 A | 6/1998 | Montulli |
| 6,035,334 A | 3/2000 | Martin et al. |
| 6,076,108 A | 6/2000 | Courts et al. |
| 6,589,290 B1 | 7/2003 | Maxwell et al. |
| 6,691,113 B1 | 2/2004 | Harrison et al. |
| 7,188,305 B1 | 3/2007 | Corbin et al. |
| 7,552,451 B2 * | 6/2009 | Alcazar ............... G06F 9/542 717/116 |

(Continued)

*Primary Examiner* — James Trujillo
*Assistant Examiner* — Jessica N Le
(74) *Attorney, Agent, or Firm* — Cantor Colburn LLP; Robert Sullivan

(57) ABSTRACT

A method includes associating a state identifier with a page of a user interface; associating an element identifier with an element of the page of the user interface; and tracking a state of the element based on the state identifier and the element identifier throughout a user session of the user interface.

20 Claims, 7 Drawing Sheets

(56) References Cited

U.S. PATENT DOCUMENTS

| | | |
|---|---|---|
| 7,650,572 B2 | 1/2010 | Olander et al. |
| 8,001,145 B1 | 8/2011 | Cornali |
| 8,195,822 B2 * | 6/2012 | McMahan ............... G06F 21/56 |
| | | 709/230 |
| 8,621,108 B2 | 12/2013 | Kamrowski et al. |
| 9,639,626 B2 * | 5/2017 | Gnech ................ G06F 17/30899 |
| 2002/0161839 A1 | 10/2002 | Colasurdo et al. |
| 2003/0120719 A1 | 6/2003 | Yepishin et al. |
| 2003/0120762 A1 | 6/2003 | Yepishin et al. |
| 2003/0195963 A1 | 10/2003 | Song et al. |
| 2005/0066037 A1 | 3/2005 | Song et al. |
| 2005/0204047 A1 | 9/2005 | Mitchell et al. |
| 2006/0031479 A1 | 2/2006 | Rode |
| 2006/0075088 A1 | 4/2006 | Guo et al. |
| 2006/0075330 A1 | 4/2006 | Guido et al. |
| 2007/0150556 A1 | 6/2007 | Fukuda et al. |
| 2008/0005793 A1 | 1/2008 | Wenig et al. |
| 2015/0212989 A1 * | 7/2015 | Rice ................... G06F 17/2247 |
| | | 715/234 |

\* cited by examiner

WEB-BROWSER BASED STATE REPOSITORY

BACKGROUND

This application is a continuation of and claims priority from U.S. patent application Ser. No. 12/421,102, filed on Apr. 9, 2009, entitled "WEB-BROWSER BASED STATE REPOSITORY", the entire contents of which are incorporated herein by reference.

The present invention relates to methods and systems for tracking client side states of web interfaces.

With the growing utilization of complex web-based graphical user interfaces, the complexity of preserving client side states of those interfaces becomes a challenging task. Using web-based applications involves a certain amount of client-server communication that is handled via stateless Hypertext Transfer Protocol (HTTP). However, complex web-based graphical user interfaces need to maintain an internal state across several HTTP requests and page reloads to maintain a consistency and to deliver a desktop like user experience. Typically, the state of a loaded web page that makes up a web-based user interface is maintained in the Document Object Model (DOM). However, the DOM values are discarded on each page change or reload and replaced by the DOM of the newly loaded page. To deliver a consistent and desktop like user experience, the states of a web-based user interface should be maintained through a page change or reload.

SUMMARY

According to one embodiment of the present invention, a method includes associating a state identifier with a page of a user interface; associating an element identifier with an element of the page of the user interface; and tracking a state of the element based on the state identifier and the element identifier throughout a user session of the user interface.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features and advantages of the invention are apparent from the following detailed description taken in conjunction with the accompanying.

DETAILED DESCRIPTION

Figure 1:
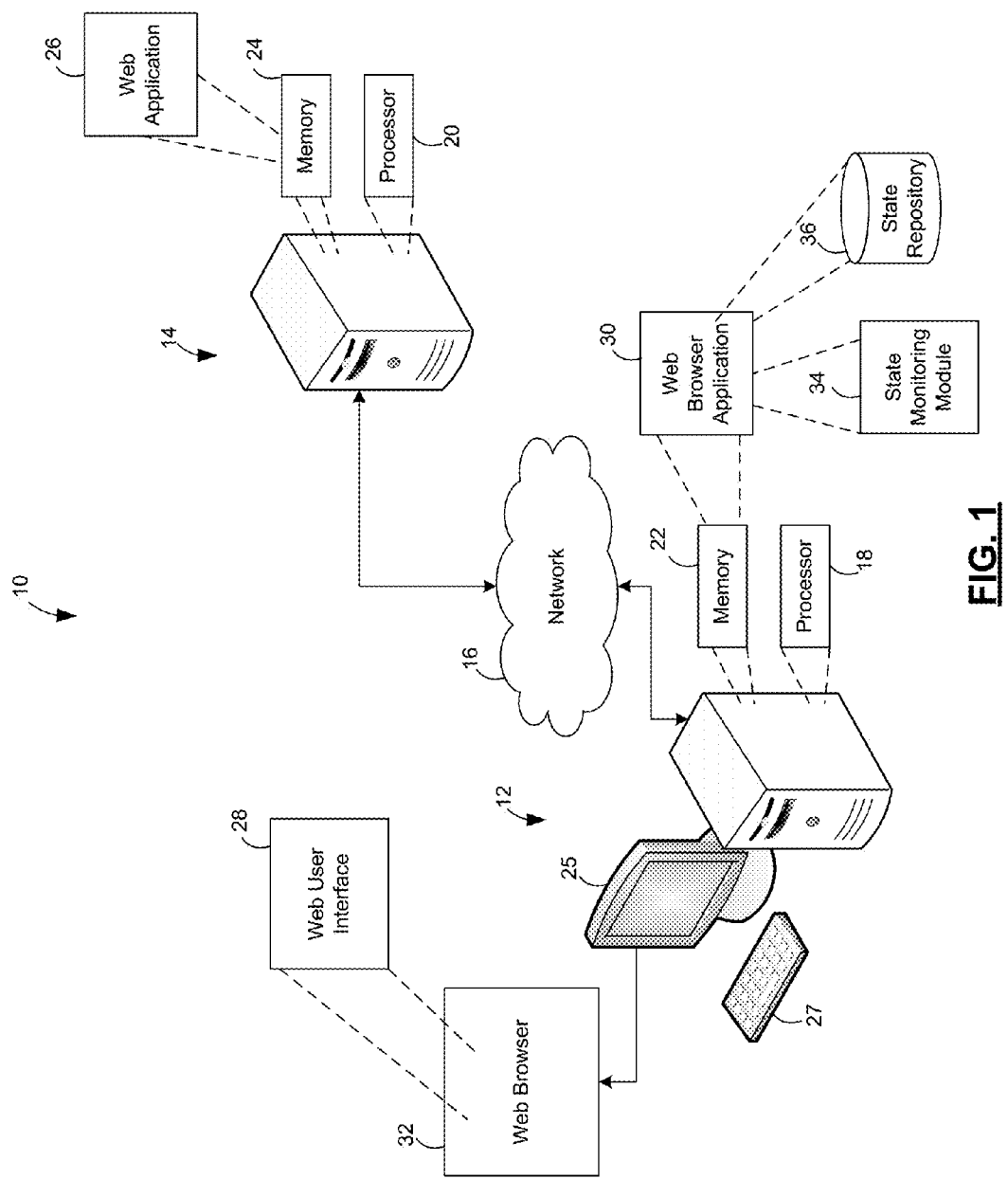
FIG. 1 is a functional block diagram illustrating a computing system that includes a state monitoring system in accordance with an exemplary embodiment.

Turning now to the drawings in greater detail, it will be seen that in FIG. 1 a computing system 10 includes one or more computers 12, 14 that are communicatively coupled via a network 16. As can be appreciated, the network 16 can be any single type or combination type of known networks including, but not limited to, a wide area network (WAN), a local area network (LAN), a global network (e.g. Internet), a virtual private network (VPN), and an intranet.

The one or more computers 12, 14 include a processor 18, 20 respectively and one or more data storage devices 22, 24 respectively. The processor 18, 20 can be any custom made or commercially available processor, a central processing unit, an auxiliary processor among several processors associated with the computer 12, 14, a semiconductor based microprocessor, a macroprocessor, or generally any device for executing instructions. The one or more data storage devices 22, 24 can be at least one of the random access memory, read only memory, a cache, a stack, or the like which may temporarily or permanently store electronic data. As shown, the computer 12 is a desktop computer (also referred to as a client) and the computer 14 is a server. As can be appreciated, the computers 12, 14 are not limited to the present example and can include, but are not limited to, a desktop computer, a laptop, a workstation, a portable handheld device, a server, or any device that includes a processor and memory.

As shown, the computer 12 is associated with a display device 25 and one or more input devices 27 that may be used by a user to communicate with the computer 12. As can be appreciated, such input devices 27 may include, but are not limited to, a mouse, a keyboard, and a touchpad.

According to an exemplary embodiment, the server computer 14 includes one or more web applications 26 that are stored in the data storage device 24 and accessed by the desktop computer 12 via the network 16. The web application 26 includes data and software that generates a user interface 28. The desktop computer 12 includes a web browser application 30 that is stored in the data storage device 22 and that communicates with the web application 26 to display the user interface 28 via a web browser 32. In various embodiments, the web browser application 30 includes a state monitoring module 34 and a state repository 36. Generally speaking, the state monitoring module 34 maintains states of the web user interface 28 without the need for custom server side and client side coding. The state repository 36 stores attributes of certain elements of the user interface 28 throughout a session. The attributes are used to track the status of the user interface 28.

Figure 2:
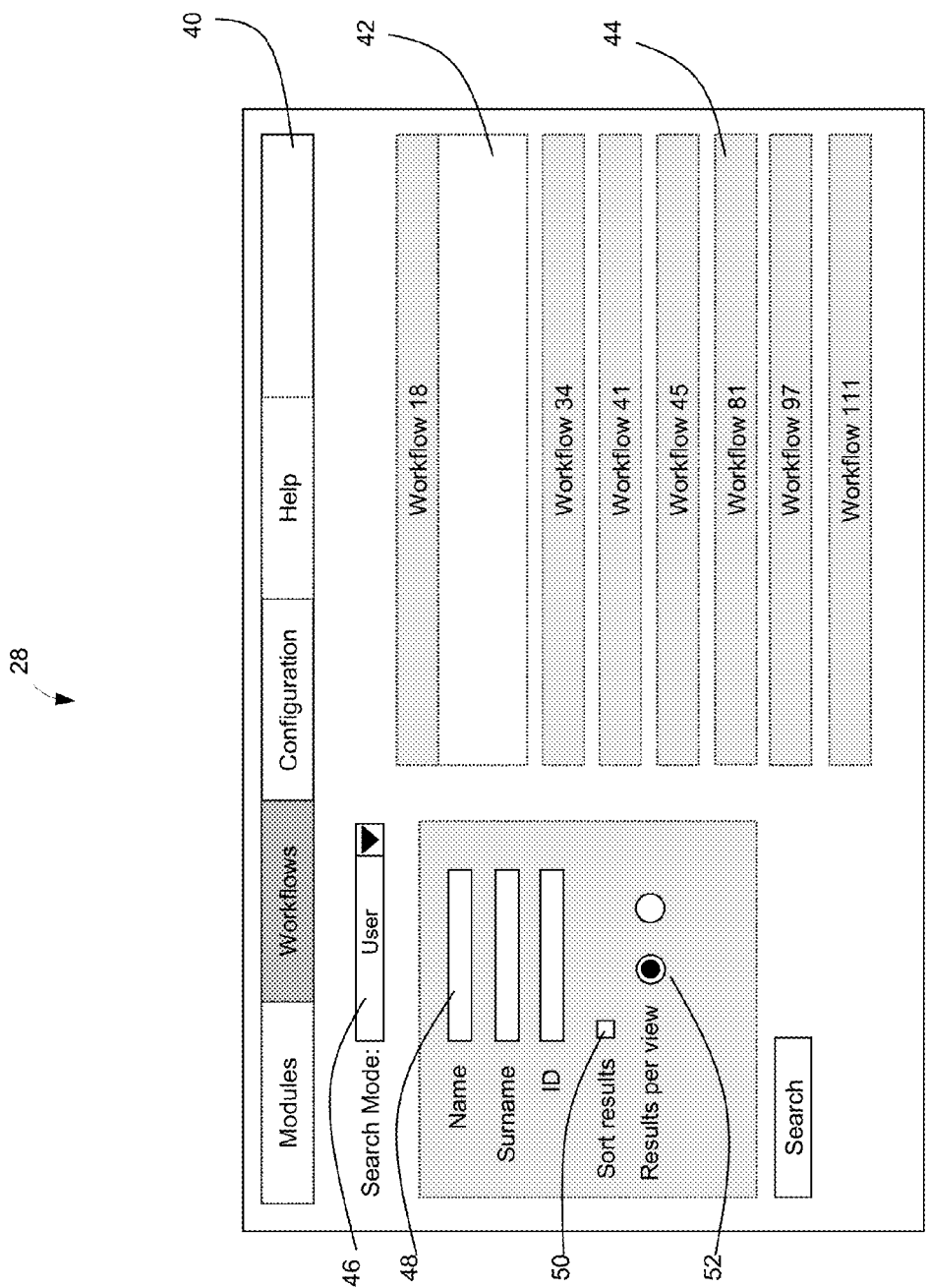
FIG. 2 is a functional block diagram illustrating an exemplary web user interface.
Figure 3:
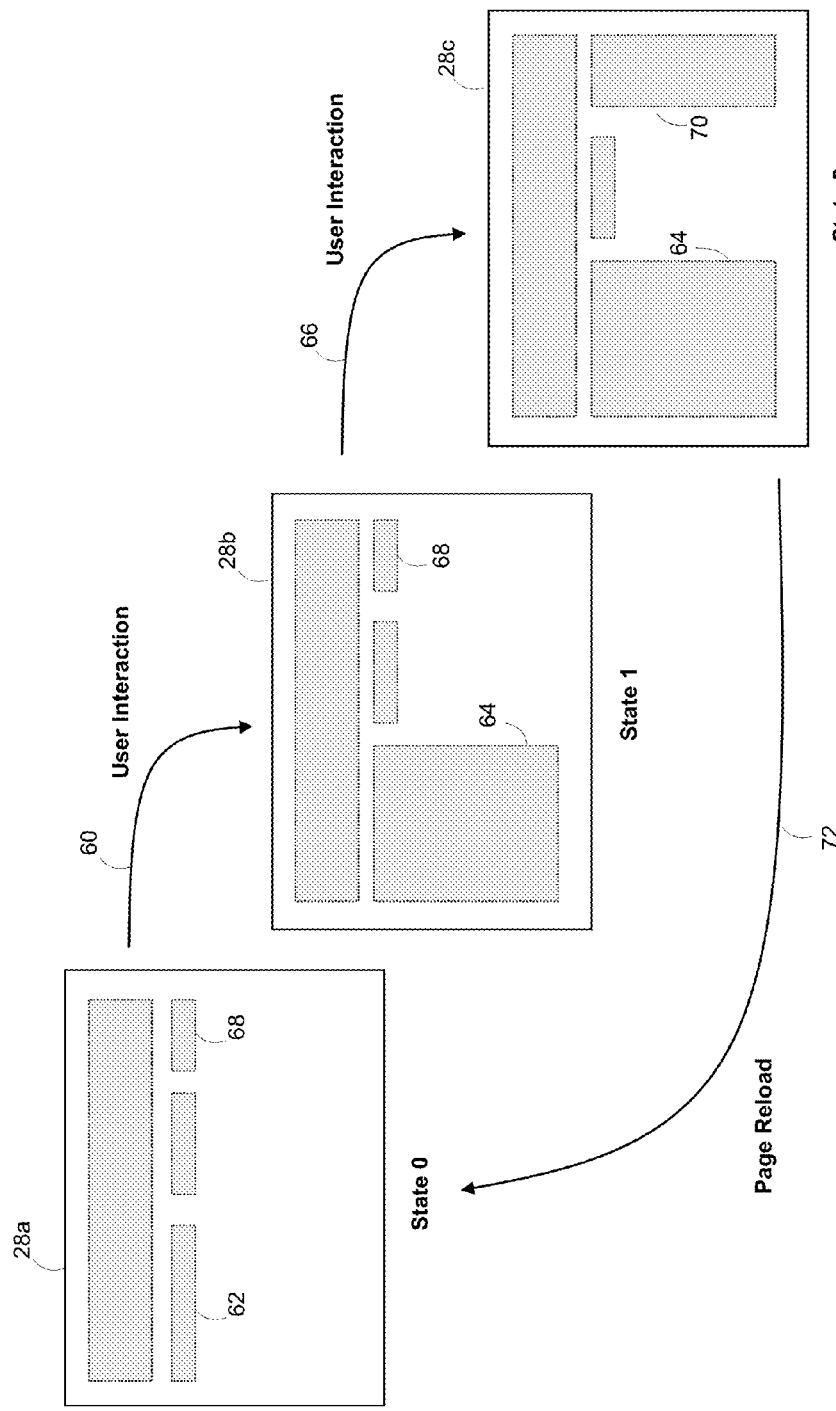
FIG. 3 is a functional block diagram illustrating exemplary state changes of the web user interface.

Turning now to FIGS. 2 and 3, an exemplary user interface 28 and exemplary state changes of the user interface 28 are shown in accordance with an exemplary embodiment. The user interface 28 includes one or more interface elements 40-52. The elements 40-52 can include, but are not limited to menus 40, pull-down menus 46, input fields 48, check boxes 50, radio buttons 52, and tab panels 42-44 (either opened or closed). Based on a user's interaction with the user interface 28 via the input devices 27, the state of the elements 40-52 change.

For example, as shown in FIG. 3, based on a first user interaction 60, a first table panel 62 of a user interface 28a is opened as shown at the tab panel element 64 of the user interface 28*b*. Based on a second user interaction 66, a pull-down menu 68 is displayed as shown at the pull-down menu 70 of the user interface 28*c*. Based on a third user interaction 72, the user interface 28 is reloaded from the web application 26 (FIG. 1) and the original states of the elements 62, 68 are reset. According to various embodiments of the present invention, the state monitoring module 34 (FIG. 1) and the state repository 36 (FIG. 1) provide methods and systems for tracking the states of each element 62, 68 such that the states can be restored upon a reload of the user interface 28.

Figure 4:
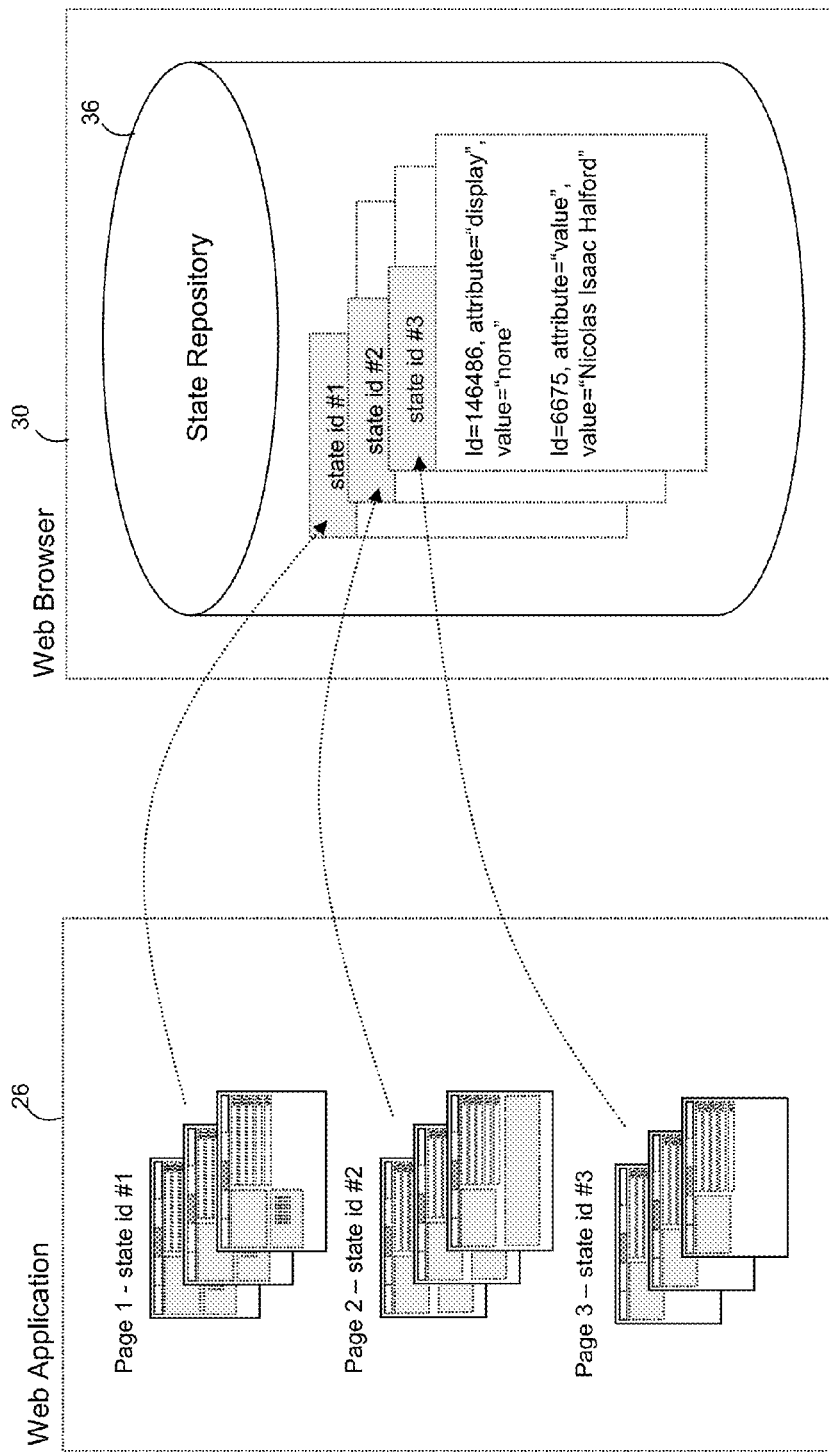
FIG. 4 is a functional block diagram illustrating a web application and a web browser application including a state repository in accordance with an exemplary embodiment.
Figure 5:
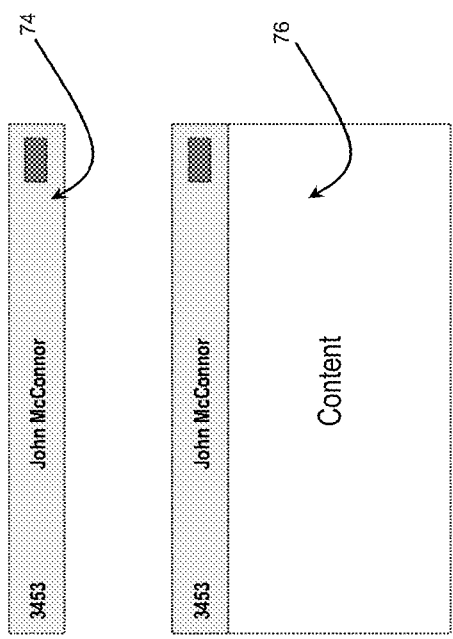
FIG. 5 is a functional block diagram illustrating an exemplary implementation of the state data stored in the state repository in accordance with an exemplary embodiment.

Turning now to FIGS. 4 and 5, the state repository 36 and associated data for tracking the states of each element 40-52 (FIG. 2) are shown. As shown in FIG. 4, the web application 26 associates a unique state identifier (ID) with each page of the user interface 28. The state ID is stored in the state repository 36 of the web browser application 30. Each element of each page includes a unique element identifier (ID) (e.g., Id=146486, Id=6675) and one or more attributes and associated values that define the state of the element (e.g., attribute="display", value="none"). The state IDs, elements IDs, and attributes are stored in the state repository 36.

A more detailed example of the data can be illustrated with regard to FIG. 5. For example, the collapsible tab element is shown in a closed state at 74 and in an open state at 76. According to an exemplary HTML implementation of the web page logic, the closed state of the tab element 74 can be implemented according to a nested HTML "DIV" element where the "DIV" style attribute "Display" is set to "none" (e.g., style="display:none"). The open state of the tab element 76 can be implemented according to a nested HTML "DIV" element where the "DIV" style attribute "Display" is set to "visible" (e.g., style="display:block" or style="display:""). For tracking the state of the tab element using a nested HTML "DIV" element, an observe tag that encloses the attribute display can be used, as shown as:

```
<div id="3453">
    <observe type="div" attribute="display" scope="session">
        <div id="146486" style="display:none;">
            <p>Content</p>
        </div>
    </observe>
</div>
```

The scope of the observe tag is set to session to preserve the data throughout the session.

Figure 6A:
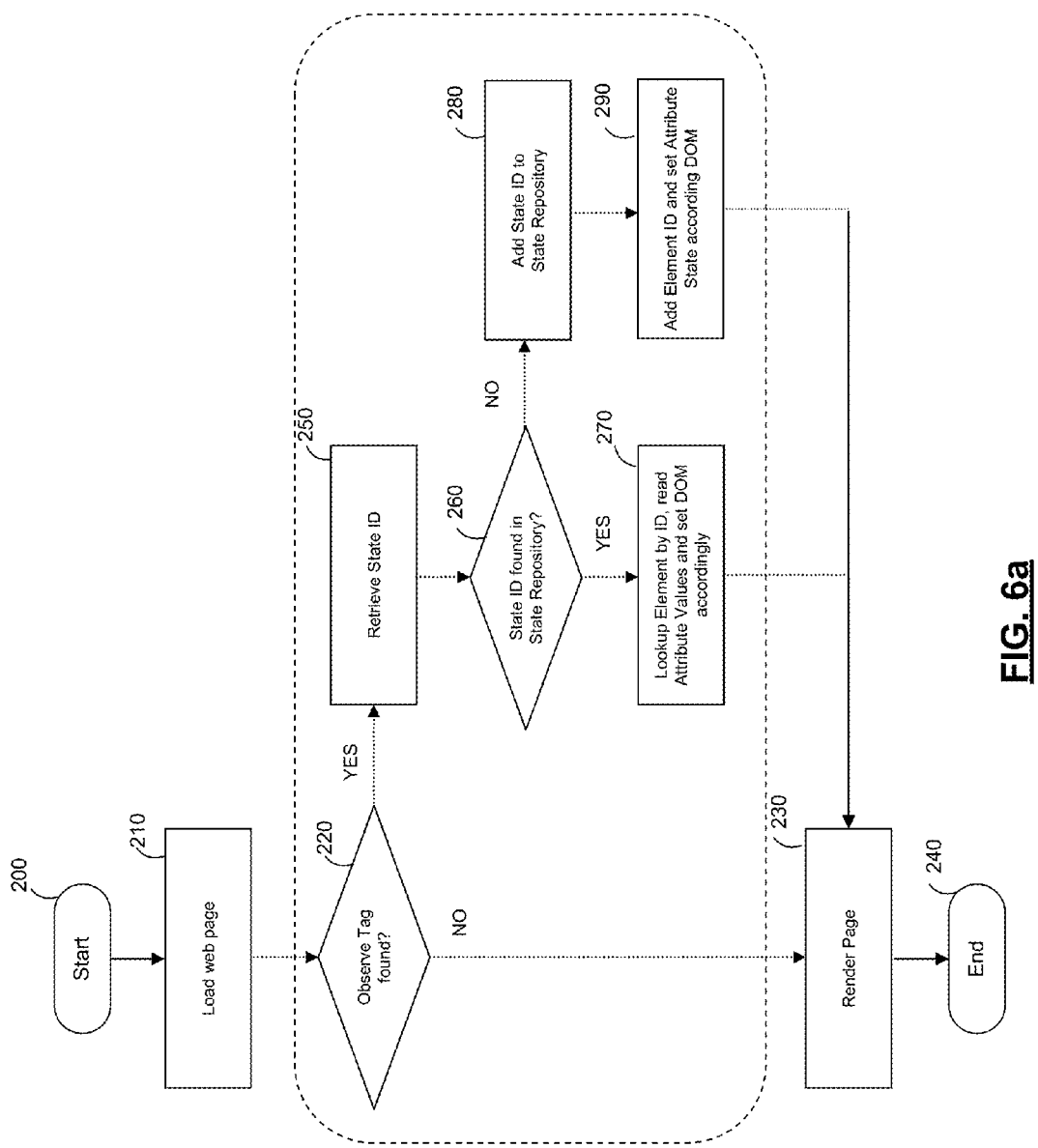
FIG. 6a is a flowchart illustrating a state monitoring method that can be performed by the state monitoring module of FIG. 1 in accordance with an exemplary embodiment.
Figure 6B:
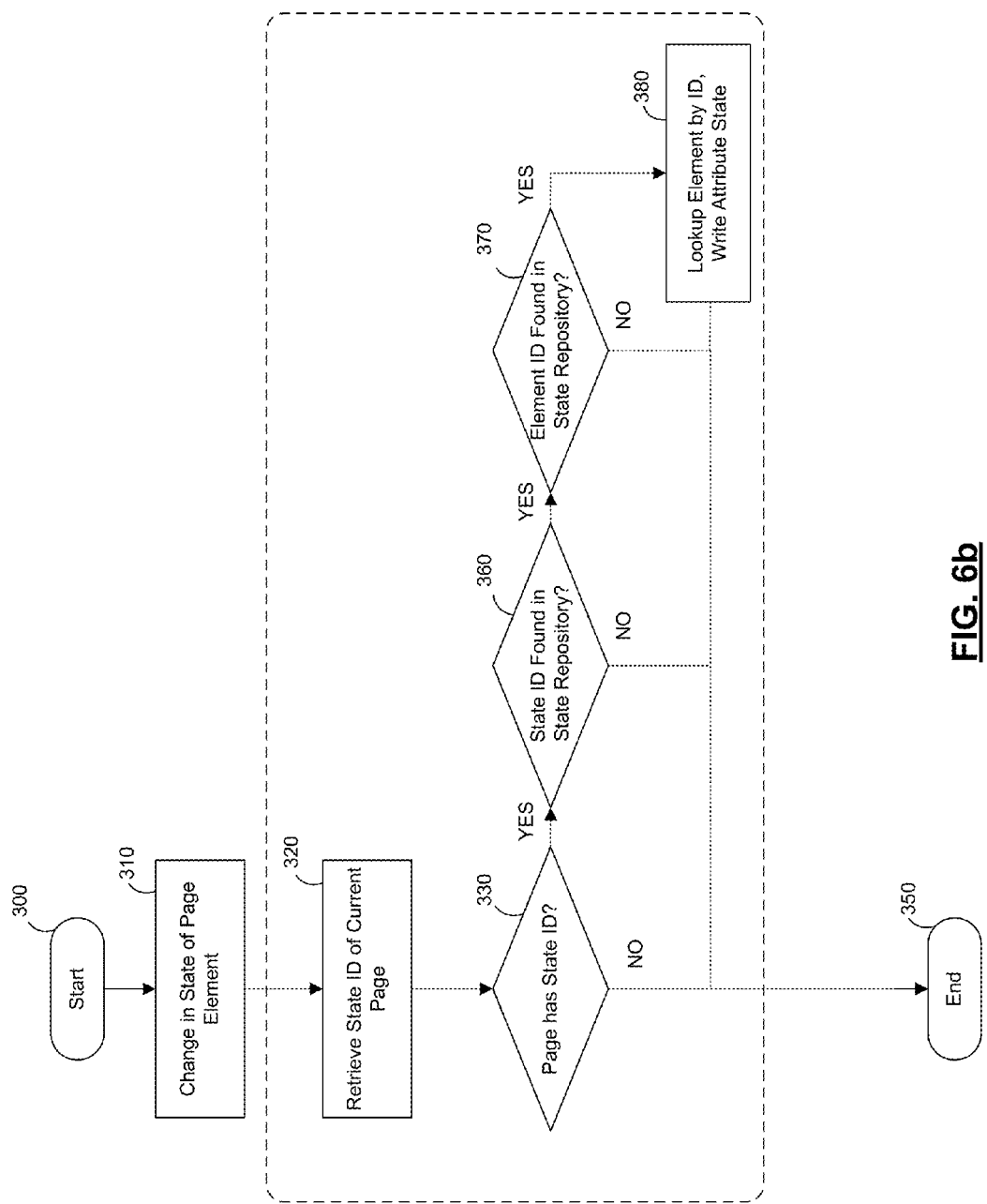
FIG. 6b is a flowchart illustrating a state monitoring method that can be performed by the state monitoring module of FIG. 1 in accordance with another exemplary embodiment.

Turning now to FIGS. 6*a* and 6*b*, flowcharts illustrate methods of tracking the states of elements 40-52 (FIG. 2) of the user interface 28 (FIG. 1) in accordance with exemplary embodiments. As can be appreciated in light of the disclosure, the order of operation within the method is not limited to the sequential execution as illustrated in FIGS. 6*a* and 6*b*, but may be performed in one or more varying orders as applicable and in accordance with the present disclosure.

In one example, as shown in FIG. 6*a*, the method may begin at 200. Upon request by the user, the page is loaded by the web browser at process block 210. The page data is evaluated at process block 220 to determine if any observe tags are found at process block 220. If no observe tags are found at process block 220, the page is rendered at process block 230 and the method may end at 240.

If, however, one or more observe tags are found in the page data at process block 220, an attempt is made to retrieve the state ID from the state repository 36 (FIG. 1) at process block 250. If the state ID is found at process block 260, the element ID associated with the observe tag is retrieved, the attribute values are read, and the DOM values are set accordingly at process block 270. Thereafter, the page is rendered based on the updated DOM values at process block 230, and the method may end at 240.

If, however, at process block 260 the state ID for that page is not found in the state repository 36 (FIG. 1), a state ID is added to the state repository 36 (FIG. 1) at process block 280. An element ID is added to the state repository 36 (FIG. 1) and the state attribute is set to the value as indicated by the DOM at process block 290. Thereafter, the page is rendered at process block 230 and the method may end at 240.

Turning now to FIG. 6*b*, in another example, the state repository 36 (FIG. 1) can be updated when the user changes states of a page element of a loaded web page based on the following method. For example, the method may begin at process block 300. A state of a page element is changed at process block 310. The change can be generated, for example, based on a user clicking on the element, entering text, or other user triggered manipulation of the page content. The state ID for the current page is retrieved at process block 320. If the page does not have a state ID at process block 330, the method may end at 350.

However, if the page has a state ID at process block 330, the state ID is looked up in the state repository 36 (FIG. 1) at process block 360. If the state ID is not found in the state repository 36 (FIG. 1) at process block 370, the method may end at 350.

However, if the state ID is found in the state repository 36 (FIG. 1) at process block 360, the element ID is looked up in the state repository 36 (FIG. 1) at process block 370. If the element ID is not found in the state repository 36 (FIG. 1) at process block 370, the method may end at 350. However, if the element ID is found in the state repository 36 (FIG. 1) at process block 370, the element is looked up by the element ID and the attribute state is changed for that element ID and stored in the state repository 36 (FIG. 1) at process block 380. Thereafter, the method may end at 350.

As will be appreciated by one skilled in the art, the present invention may be embodied as a system, method or computer program product. Accordingly, the present invention may take the form of an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-useable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instruction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system comprising:
a computer readable medium comprising:
  a web-browser application configured to:
    navigate to a page from a plurality of pages of a website that is served by a web application that is being executed on a remote computer;
    detect an observe tag in an element of the page and in response, identify display attributes of the element from a state repository based on a state identifier for the page and an element identifier for the element, and in response to the state repository not including the display attributes, adding an entry in the state repository to store the display attributes to track a state of the element;
  the state repository configured to locally store:
    the state identifier,
    the element identifier wherein, the element identifier is unique to the element of the page, and
    the display attributes for the element, wherein the element is a component of a user interface of the website; and
  a state monitoring module configured to:
    store display attribute value indicating the state of the element locally in the state repository based on the state identifier and the unique element identifier,
    track the state of the element when navigating through the plurality of pages of the website based on the state identifier, the unique element identifier, and the attribute by setting the locally stored attribute value to a different attribute value whenever the state of the element changes to a different state due to user triggered manipulation of the element, wherein different attribute values indicate different states of the element, and an original attribute value indicates an original state of the element, and wherein if the user interface is reloaded in a new session, then the state of the element is reset to the original state by setting the locally stored attribute value to the original attribute value; and
a processor that communicates with the computer readable medium.

2. The system of claim 1 wherein the state repository is included in a web browser application locally executed by the processor.

3. The system of claim 1 wherein the state monitoring module is included in a web browser application locally executed by the processor.

4. The system of claim 1 wherein the state monitoring module tracks the state by setting an attribute associated with the unique element identifier based on a Document Object Model, and by storing the attribute in the state repository.

5. The system of claim 1 wherein the state monitoring module tracks the state by setting an attribute of a Document Object Model based on an attribute value associated with the unique element identifier.

6. The system of claim 1 wherein the state monitoring module evaluates data that defines the website for observe tag data, and wherein the state monitoring module tracks the state based on the observe tag data.

7. The system of claim 6 wherein the observe tag data is associated with the state identifier, the unique element identifier, and the attribute.

8. The system of claim 6 wherein the observe tag data includes a session scope.

9. The system of claim 1 wherein the element is one of a menu, a pull-down menu, a check box, a radio button, and a tab panel.

10. A computer-implemented method comprising:
navigating, by a processor, using a web-browser application, to a page from a plurality of pages of a website that is served by a web application that is being executed on a remote computer;
detecting, by the processor, an observe tag in an element of the page and in response, identify display attributes of the element from a state repository based on a state identifier for the page and an element identifier for the element, and in response to the state repository not including the display attributes, adding an entry in the state repository to store the display attributes to track a state of the element;
the state repository configured to locally store:
the state identifier,
the element identifier wherein, the element identifier is unique to the element of the page, and
the display attributes for the element, wherein the element is a component of a user interface of the website; and
storing, by the processor, using a state monitoring module, a display attribute value indicating the state of the element locally in the state repository based on the state identifier and the unique element identifier; and
tracking, by the processor, the state of the element when navigating through the plurality of pages of the website based on the state identifier, the unique element identifier, and the attribute by setting the locally stored attribute value to a different attribute value whenever the state of the element changes to a different state due to user triggered manipulation of the element, wherein different attribute values indicate different states of the element, and an original attribute value indicates an original state of the element, and wherein if the user interface is reloaded in a new session, then the state of the element is reset to the original state by setting the locally stored attribute value to the original attribute value.

11. The computer-implemented method of claim 10, wherein the state repository is included in the web-browser application locally executed by the processor.

12. The computer-implemented method of claim 10, wherein the state monitoring module is included in the web-browser application locally executed by the processor.

13. The computer-implemented method of claim 10, wherein the state monitoring module tracks the state by setting an attribute associated with the unique element identifier based on a Document Object Model, and by storing the attribute in the state repository.

14. The computer-implemented method of claim 10, wherein the state monitoring module tracks the state by setting an attribute of a Document Object Model based on an attribute value associated with the unique element identifier.

15. The computer-implemented method of claim 10, further comprising evaluating, by the processor using the state monitoring module, data that defines the website for observe tag data, and wherein the state is tracked based on the observe tag data.

16. The computer-implemented method of claim 15, wherein the observe tag data is associated with the state identifier, the unique element identifier, and the attribute.

17. The computer-implemented method of claim 15, wherein the observe tag data includes a session scope.

18. The computer-implemented method of claim 10, wherein the element is one of a menu, a pull-down menu, a check box, a radio button, and a tab panel.

19. A computer program product, comprising a non-transitory tangible computer readable storage medium bearing software instructions that, when executed by a computer, implement a method for enabling predetermined operations, the predetermined operations including:
navigating, by a web-browser application, to a page from a plurality of pages of a web site that is served by a web application that is being executed on a remote computer;
detecting, by the web-browser application, an observe tag in an element of the page and in response, identify display attributes of the element from a state repository based on a state identifier for the page and an element identifier for the element, and in response to the state repository not including the display attributes, adding an entry in the state repository to store the display attributes to track a state of the element;
the state repository configured to locally store:
the state identifier,
the element identifier wherein, the element identifier is unique to the element of the page, and
the display attributes for the element, wherein the element is a component of a user interface of the website; and
storing, by the web-browser application, using a state monitoring module, a display attribute value indicating the state of the element locally in the state repository based on the state identifier and the unique element identifier; and
tracking, by the web-browser application, the state of the element when navigating through the plurality of pages of the web site based on the state identifier, the unique element identifier, and the attribute by setting the locally stored attribute value to a different attribute value whenever the state of the element changes to a different state due to user triggered manipulation of the element, wherein different attribute values indicate different states of the element, and an original attribute value indicates an original state of the element, and wherein if the user interface is reloaded in a new session, then the state of the element is reset to the original state by setting the locally stored attribute value to the original attribute value.

20. The computer program product of claim 19, wherein the element is one of a menu, a pull-down menu, a check box, a radio button, and a tab panel.

\* \* \* \* \*